United States Patent [19]
Inui et al.

[11] Patent Number: 5,204,821
[45] Date of Patent: Apr. 20, 1993

[54] PARTS SUPPLY INSTRUCTION APPARATUS

[75] Inventors: Hiroyuki Inui; Satoshi Kuroiwa, both of Aichi; Yoshito Fujii, Nagoya; Toshiaki Ochiai, Toyota; Takao Asahara, Toyota; Yukito Andou, Toyota, all of Japan

[73] Assignee: Toyota Jidosha Kabushiki Kaisha, Japan

[21] Appl. No.: 596,495

[22] Filed: Oct. 12, 1990

[30] Foreign Application Priority Data

Oct. 16, 1989 [JP] Japan ................... 1-266302

[51] Int. Cl.$^5$ ............................................ G06F 15/46
[52] U.S. Cl. ................... 364/468; 364/403; 364/478
[58] Field of Search ............ 364/401, 402, 403, 468, 364/478, 479, 148, 464

[56] References Cited

U.S. PATENT DOCUMENTS

| | | | |
|---|---|---|---|
| 4,472,783 | 9/1984 | Johnstone et al. | 364/474 |
| 4,648,023 | 3/1987 | Powell | 364/468 |
| 4,656,591 | 4/1987 | Goldberg | 364/478 |
| 4,669,047 | 5/1987 | Chucta | 364/468 |
| 4,783,740 | 11/1988 | Ishizawa et al. | 364/478 |
| 4,819,176 | 4/1989 | Ahmed et al. | 364/478 |
| 4,958,292 | 9/1990 | Kaneko et al. | 364/478 |
| 5,063,506 | 11/1991 | Brockwell et al. | 364/403 |

FOREIGN PATENT DOCUMENTS

62-95852 6/1987 Japan .

OTHER PUBLICATIONS

"Management of Factory By Toyota", published Aug. 25, 1978 (with partial English translation).

Primary Examiner—Jerry Smith
Assistant Examiner—Thomas E. Brown
Attorney, Agent, or Firm—Finnegan, Henderson, Farabow, Garrett & Dunner

[57] ABSTRACT

The parts supply instruction apparatus includes a production schedule system, a parts information system, a car information system, and an order issue managing system which are preferably located at an assembly factory. The order issue managing system scans a parts master file and extracts required data therefrom relating to parts to be ordered to produce order issue data. The order issue data is sent to a received order managing system which is located at a parts supply factory. The type of parts supply order system operated by the apparatus can be changed between the production schedule system, the part information system and the car information system merely by changing a designation parameter corresponding to a respective system, inserted in an order type column of the parts master file.

9 Claims, 9 Drawing Sheets

| PART CODE | ORDER TYPE | PARTS SUPPLY FACTORY CODE | ASSEMBLY FACTORY CODE | NUMBER OF TRUCK DELIVERIES SCHEDULE | SUPPLY LEAD TIME | NUMBER OF PARTS IN PALLET |
|---|---|---|---|---|---|---|
| 47810-2250 | 1 | 1001-01 | 2N3-12 | 2 | 4 | 5 |
| 47810-2243 | 2 | 23159 | 2B5-2 | 8 | 4 | 5 |
| 47810-21136 | 3 | 2811-05 | 2C4-5 | — | — | 1 |
| | | | | | | |
| | | | | | | |
| | | | | | | |
| | | | | | | |

| DATE / PART CODE | 1 | 2 | 3 | 4 | 5 | 8 | 9 | 10 | 11 | 12 | 15 | 16 | 17 | 18 | 19 |
|---|---|---|---|---|---|---|---|---|---|---|---|---|---|---|---|
| 47810-22050 | 2 | 3 | 2 | 3 | 4 | 2 | 3 | 2 | 3 | 4 | 2 | 3 | 3 | 4 | 2 |
| 47810-22031 | 0 | 0 | 0 | 0 | 0 | 0 | 1 | 0 | 0 | 0 | 0 | 0 | 0 | 0 | 0 |

| CAR SPECIFICATION | PART CODE |
|---|---|
| GA70-5B293 | 47810-21136 |
| GA71-5I393 | 47810-21139 |
|  |  |

PARTS SUPPLY INSTRUCTION APPARATUS

BACKGROUND OF THE INVENTION

1. Field of the Invention

The present invention relates to apparatus for giving instructions for the supply of parts from a parts supply factory to an assembly factory, hereinafter termed a "parts supply instruction apparatus".

2. Description of the Prior Art

There are three established systems used for the supply of parts from at least one parts supply factory to at least one assembly factory in the car manufacturing industry, namely, a "supply-on-schedule" system, a "supply-on-parts-consumption" system often called a "Kanban" system, and a "supply-in-order" system.

The "supply-on-schedule" system is a parts supply system according to which a parts supply schedule, including instructions relating to the type of part, the number of parts, a supply date, etc., is preliminarily made on the basis of a monthly car production schedule at the assembly factory. The parts supply schedule is given to the parts supply factory beforehand so that the parts can be manufactured well in advance, even though the actual parts supply is performed according to a fixed order which is given to the parts supply factory only a few days before the actual assembly operation utilizing the respective parts.

The "Kanban" system is a parts supply system according to which a parts supply order is made at the assembly factory on the basis of the actual consumption of parts thereat and is issued to the parts supply factory in the form of a card called a Kanban so that the same type and number of parts as are consumed, are supplied to the assembly factory "just in time" for their assembly into a car on the assembly line. The "Kanban" is conveyed back and forth between the parts supply factory and the assembly factory by a delivery truck together with a pallet for housing the respective parts.

The "supply-in-order" system is a parts supply system, according to which an order for the parts required for assembly into a respective car is issued by the assembly factory to the parts supply factory when the car is actually brought onto the assembly line so that the ordered parts are supplied to the assembly line before the car is conveyed to the respective positions on the assembly line where the parts are to be assembled into the car. In the "supply-in-order" system, the order in which the parts are supplied corresponds to the order in which cars are brought onto the assembly line, so that the order of supply of parts is thereby determined automatically.

Recently, a need has arisen to be able to select from a plurality of the above-described three parts supply systems so that production can be performed in the most effective manner. However, problems, as described below, have arisen in developing an apparatus capable of such a flexible selection.

Firstly, since the above-described three parts supply systems are independent of each other, a parts master file which records the parts specifications, control devices, e.g. sensing means, and an operating computer, dedicated for operating one system can not be used to operate any of the other systems.

Secondly, in order to change from one system to another system, the parts master file of the first system must be greatly changed in order to render it suitable for use in operating another one of the systems. Such a radical change will necessarily be accompanied by errors even if such modification is possible at all.

Thirdly, if each assembly factory were to be provided with all the different types of parts master files, sensors, and computers for the purpose of enabling changing-over between the systems, the cost increase would be unacceptably high.

SUMMARY OF THE INVENTION

An object of the invention is to provide a parts supply instruction apparatus wherein the parts supply system to be operated by the apparatus can be readily selected from a plurality of different parts supply systems.

Another object of the invention is to provide a parts supply instruction apparatus wherein change-over from one operating parts supply system to another is sufficiently simple that the likelihood of errors occurring as a result of the change-over, is virtually eradicated.

Another object of the invention is to provide a parts supply instruction apparatus wherein a plurality of different parts supply systems which can be operated by the apparatus are devised to incorporate common features so as to minimize the cost of the apparatus.

The above-described objects can be attained by a parts supply instruction apparatus in accordance with the present invention.

A parts supply instruction apparatus, according to one embodiment of the invention, for giving instructions for the supply of parts from at least one parts supply factory to at least one assembly factory, includes:

a production schedule system for providing a parts supply schedule for an object assembly factory on the basis of a presumed car production schedule;

a parts information system, provided at the assembly factory, for providing information about the consumption of parts at the assembly factory, the parts information system including a first sensor for detecting the consumption of parts at the assembly factory;

a car information system, provided at the assembly factory, for providing information about each car brought onto an assembly line of the assembly factory, the car information system including a second sensor for detecting the type of car passing the second sensor;

an order issue managing system for scanning a parts master file to extract required data therefrom relating to parts to be ordered on the basis of information fed to the order issue managing system from the production schedule system, the parts information system and the car information system; and a received order managing system, provided at an object parts supply factory, for receiving orders for parts issued by the order issue managing system and transmitted via a communication network and for printing out the required data relating to the ordered parts.

Since the above-described apparatus incorporates the aforesaid three parts supply systems and the order issue managing system is connected to the three parts supply systems, the parts supply system can be changed from one system to another system by adjusting the order issue managing system. A change-over operation which comprises changing a designation parameter in the parts master file, is so simple that it will rarely result in any error occurring in practice. The production schedule system, the parts information system and the car information system do not need their own separate computers for producing the parts order issue data, since the data for any one of the systems is produced by the computer of the order issue managing system. As a result, the cost of the apparatus is not significantly increased.

BRIEF DESCRIPTION OF THE DRAWINGS

The above and other objects, features and advantages of the present invention will become more apparent and will be more readily appreciated from the following detailed description of the preferred embodiments of the invention taken in conjunction with the accompanying drawings, in which:

FIG. 3(1) is a table illustrating one example of the contents of a parts master file stored in a host computer and used in common for any one of a plurality of parts supply systems selected for the operation of the parts supply instruction apparatus of FIG. 1;

FIG. 3(2) is a table illustrating one example of the contents of a monthly production schedule for use when a production schedule system is selected for the operation of the parts supply instruction apparatus of FIG. 1;

FIG. 3(3) is a table illustrating one example of the contents of an order time list for use when a parts information system is selected for the operation of the parts supply instruction apparatus of FIG. 1;

FIG. 3(4) is a table illustrating one example of the contents of a concordance table between car specifications and corresponding part codes, for use when the order issue managing system is selected for the operation of the parts supply instruction apparatus of FIG. 1;

FIG. 6(1) is a flow chart for the production of order issue data for use when the production schedule system is selected for the operation of the parts supply instruction apparatus of FIG. 1;

FIG. 6(2) is a flow chart for the production of order issue data for use when the parts information system is selected for the operation of the parts supply instruction apparatus of FIG. 1;

FIG. 6(3) is a flow chart for the production of order issue data for use when the car information system is selected for the operation of the parts supply instruction apparatus of FIG. 1; and FIG. 6(4) is a flow chart for changing a designation parameter in the order type column of a parts master file when a parts supply system is changed to another such system, for the operation of the parts supply instruction apparatus of FIG. 1.

DETAILED DESCRIPTION OF THE PREFERRED EMBODIMENTS

Figure 1:
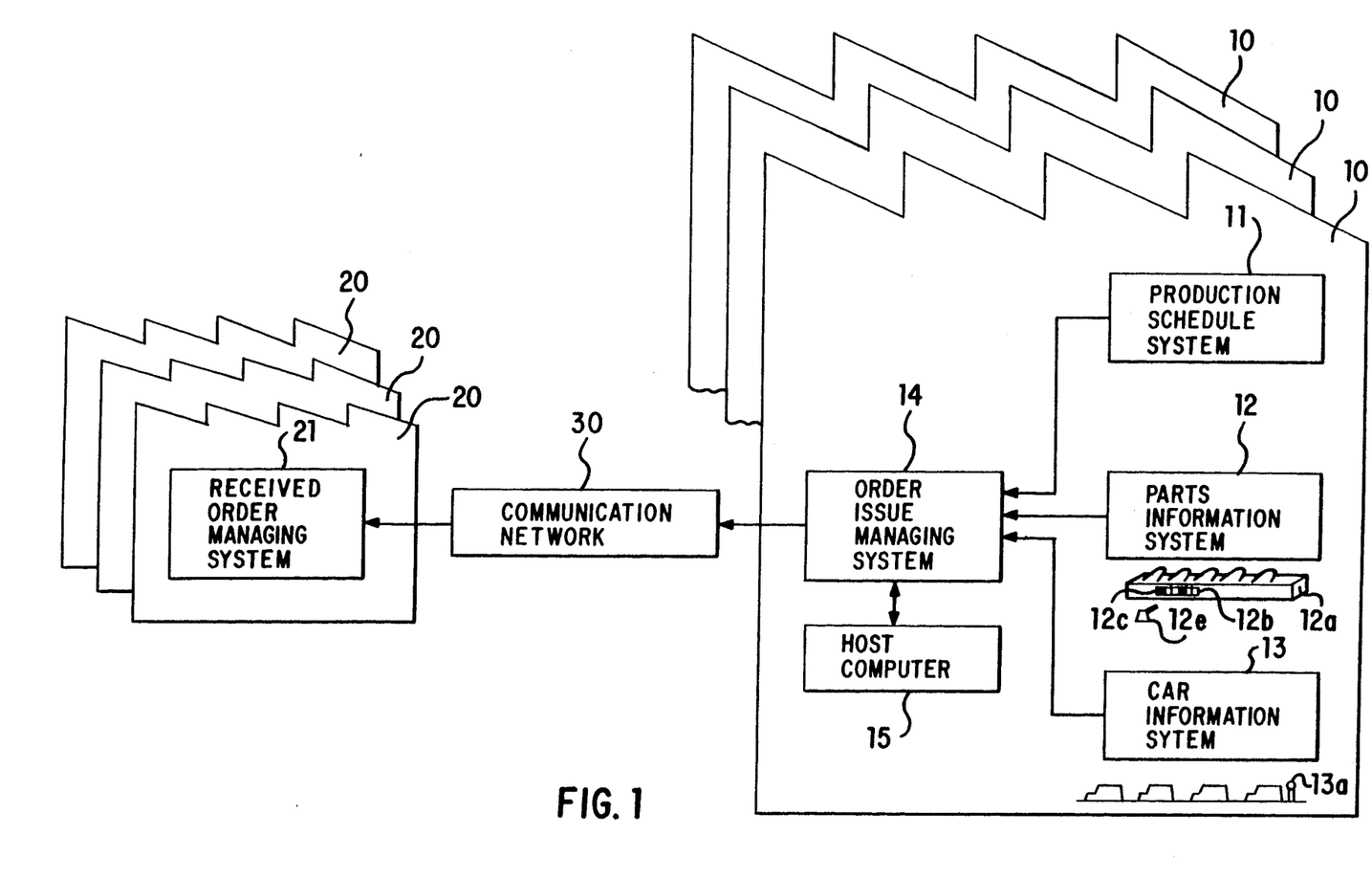
FIG. 1 is a system diagram of a parts supply instruction apparatus according to a first embodiment of the present invention.

As illustrated in FIG. 1, at least one car assembly factory 10 and at least one parts supply factory 20 are electrically connected to each other via a communication network 30 such as a network of transmission wires. For each assembly factory 10, there are provided a production schedule system 11, a parts information system 12, a car information system 13 and an order issue managing system 14 which is electrically connected to the three systems 11, 12 and 13. The order issue managing system 14 is electrically connected to a host computer 15 located at the assembly factory 10. The production schedule system 11, the order issue managing system 14 and the host computer 15 may be located at a control center of the car manufacturing company separate from the assembly factory 10 and the parts supply factory 20.

The production schedule system 11 generally corresponds to the prior art schedule supply system. A parts supply schedule 17 as shown in FIG. 3(2) is produced by the production schedule system 11 on the basis of a monthly car production schedule and is electrically transmitted to the order issue managing system 14. The monthly parts supply schedule 17 is a presumed schedule, which is changeable. The presumed schedule is sent to the order issue managing system 14 and to the parts supply factory 20 a certain period of time, for example one month, before actual assembly is due to take place at the assembly factory 10. Therefore, the preparation of the required parts at the parts supply factory 20 can be smoothly regulated. The order issue managing system 14 produces a finalized parts supply schedule on the basis of the presumed schedule. The finalized schedule is sent to the parts supply factory 20 a few days, for example three days, before assembly takes place.

The parts information system 12 incorporates an element, namely a sensing device, of the prior art Kanban system. The parts information system 12 includes a sensor 12e for sensing the consumption of parts, as they are assembled into a car on the assembly line. Usually, a plurality of parts are housed in a pallet 12a to which a parts indication card, called a Kanban, 12b is attached. All the required data is printed on the Kanban 12b in the form of a bar code 12c. When a part is extracted from the pallet 12a, the bar code 12c printed on the Kanban 12b attached to the pallet 12a, is read by the sensor 12e, which is a particular type of bar code reader. The output signals of the sensor 12e indicate what types of parts have been consumed at the assembly line and what types of parts should be supplied to the assembly line of the assembly factory, the number of the parts to be supplied, and the time when the parts must be supplied to the assembly line. The output signals are electrically sent from the bar code reader to the order issue managing system 14.

The car information system 13 incorporates one element, namely a sensing device, of the prior art "supply-in-order" system. The car information system 13 includes a sensor 13a, such as a camera or a card reader, capable of detecting the type of a car, or detecting the specification of a car, passing the sensor. The sensor 13a is disposed at a particular portion of the assembly line, for example at an entrance portion of the assembly line, so as to detect each car passing the sensor. The output of the car information system 13 is transmitted to the order issue managing system 14.

Figure 2:
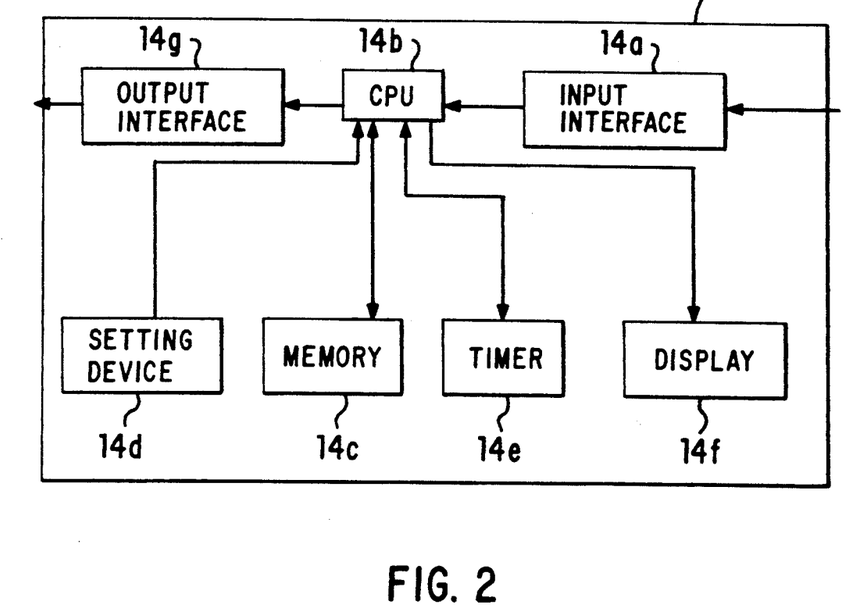
FIG. 2 is a block diagram representing the order issue managing system of the parts supply instruction apparatus of FIG. 1.
Figure 3:
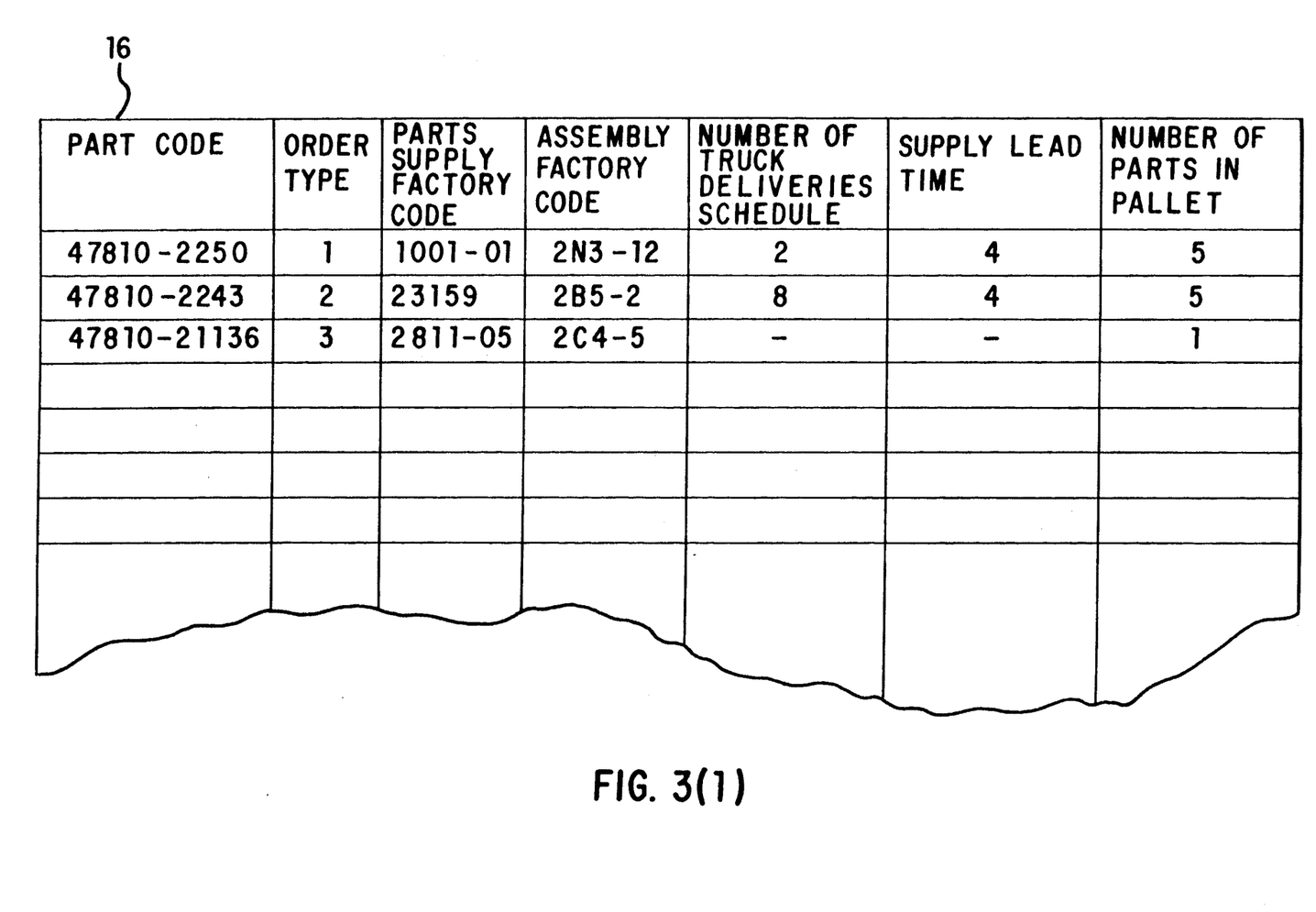

The order issue managing system 14 incorporates the computer sections of the prior art "supply-on-schedule" system, the "Kanban" system, and the "supply-in-order" system. The order issue managing system 14 includes a computer which, as shown in FIG. 2, comprises an input interface 14a, a central processor unit 14b, a memory 14c including a read only memory and a random access memory, a setting device 14d, a display 14f, and an output interface 14g. The order issue managing system 14 may be electrically connected to a host computer 15 which is located at the assembly factory 10 or at a control center separate from the assembly factory 10 and the parts supply factory 20. The order issue managing system 14 or the host computer 15 stores a parts master file 16.

The order issue managing system 14 is adapted to produce order issue data relating to parts to be ordered, on the basis of information received from the production schedule system 11, the part information system 12 and the car information system 13. In the prior art, each of the different types of part supply systems is provided with a respective computer and parts file which are independent of those of the other systems. In contrast, according to the present invention, each such system is provided with only a sensor and/or an information providing device, and the formation of order issue data for each system is performed by a common order issue managing system 14. This means that the computer sections of the three different types of parts supply systems are replaced by the single computer of the order issue managing system of an apparatus according to the present invention and therefore a cost saving is made possible. Furthermore, in prior art systems, each computer needs its own parts file, whereas, in apparatus according to the invention, a single parts master file 16 can be used in common for the three systems and the parts master file 16 is stored in the computer of the order issue managing system 14 or the host computer 15.

The order issue data to be produced by the order issue managing system 14, includes an order type, a part code, an assembly series number, a parts supply factory code, the number of parts to be supplied, an assembly factory code, a supply date/time, the number of parts housed in one pallet, and an order series number. Cyclic series numbers, for example, 00001-99999 are used for the order series numbers. This order issue data is stored in the memory 14c. In this instance, the order series number is used as a key for storing the data.

Of the order issue data, the order type, the parts supply factory code, the assembly factory code, the supply date/time, and the number of parts housed in one pallet are registered in the parts master file 16 on the basis of the part code as shown in FIG. 3(1) and are stored in the computer of the order issue managing system 14 or the host computer 15. The parts master file 16 further includes information about the number of delivery truck conveyances between the factories and the lead time necessary for supply of the respective parts.

The designation parameters "1", "2" and "3" in the order type column of the parts master file 16 have the following meanings:
"1"—a supply in accordance with the "supply-on-schedule"system;
"2"—a supply in accordance with the "Kanban" system; and
"3"—a supply in accordance with the "supply-in-order" system.

An operator can change the designation parameter in the order type column using the setting device 14d. More particularly, as illustrated in FIG. 6(4), an operator can alter the order type merely by changing the designation parameter at step 641. This alteration is very simple and is unlikely to lead to any errors being made. Since an order type is usually determined on the basis of respective parts supply and assembly factories, the parameters inserted in the order type column are predetermined. However, when an operator wants to change temporarily the supply order system, the operator can change the order type in accordance with the procedure shown in FIG. 6(4).

In the order issue managing system 14, the order issue data is produced in accordance with the respective parts supply systems as follows:

Data formation in the cases of the "schedule supply system" is performed in accordance with FIG. 6(1). The monthly production schedule 17 (see FIG. 3(2)) which is received from the production schedule system 11, is read at step 611. The monthly production schedule 17 includes the number of pallets housing a plurality of similar parts which will be consumed every day of the month with respect to every part code. For example, the monthly production schedule 17 shows that three pallets should be supplied to the assembly factory by April 4 with respect to the part with the part code "47810-22050". Since one pallet includes five parts according to FIG. 3(1), fifteen parts should be supplied to the assembly factory 10 by April 4.

At step 612, all the part codes having the order type parameter "1", which corresponds to the "supply-on-schedule" system, are scanned and extracted from the parts master file 16. At step 613, information about the number of the ordered parts, the supply date/time, the order issue date of each extracted part code, is displayed on the display 14f of the computer of the order issue managing system 14. In this connection, the following relationships exist between such information:

| | |
|---|---|
| Number of ordered parts = | the presumed number of parts consumed; |
| Supply date/time = | presumed date/time of consumption; |
| and | |
| Order date = | supply date − supply lead time |
| | = supply date − (supply lead time)/ (numbers of truck conveyances per day). |

For example, with respect to the part code "47810-22050", the supply date is April 4, while the order date is April 2, because the supply lead time is four (see FIG. 3(1)) and the number of truck conveyances per day is two (see FIG. 3(1)). This means that the order has to be issued two days prior to the supply date.

Step 614 investigates whether or not the displayed data needs to be modified. In a case where it is judged that some modification is necessary, when the stock at the assembly factory and the production ability of the parts supply factory is taken into account, the data to be modified, for example the number of the parts to be ordered, is modified at step 614 using the setting device 14d. The data including the modified number of parts to be ordered is stored in an issue data file at step 616.

Then, at step 617, the computer scans all the part codes with the order type "1" and determines the part codes which have arrived at the order issue date, by utilizing the timer 14e. For each of the part codes so determined, the data concerning the order type, the parts factory code, the assembly factory code, and the number of the parts to be housed in one pallet, is extracted from the parts master file 16, and then an order series number is given to the part code, to produce order issue data. The order issue data, which is not presumed data but finalized data, is sent via the communication network 30 to respective parts supply factories 20. The issued orders are registered in an issued orders register file at step 618, and then at step 619, the registered data is deleted from the memory 14c. The finalized data is usually transmitted three days prior to the actual consumption of the parts at the assembly factory 10.

The production of the data required for the "Kanban" supply system is carried out in accordance with FIG. 6(2). The order issue time list 18 (see FIG. 3(3)) for parts to be supplied in accordance with the "Kanban" supply system is stored beforehand in the memory 14c or the host computer 15. At step 621, information received from the parts information system 12 is read. Step 622 determines whether or not the order type parameter of the object part code is "2". If the order type parameter of the part code is "2", the routine proceeds to step 623 and the Kanban information is stored in a Kanban file. Then, step 624 determines whether or not the part code has come to the order issue time.

When the part code is determined to have come to the order issue time, the routine proceeds to step 625 where the number of the part codes which have been stored in the Kanban file during the period of time from the previous order issue time to the present time, is counted and the number is deemed to be the number of parts with the part code to be ordered.

The supply date/time is calculated at step 626 by adding a supply lead time to the order issue date/time. Then, at step 627, order issue series numbers are given to the part codes, so that the order issue data is produced. The order issue data is sent to the corresponding parts supply factories 20 via the communication network 30. Then, at step 628, the issued order data is stored in an issued order file and then the data is deleted from the memory 14c at step 629.

In a case where the information transmitted from the parts information system 12 includes only the part codes, the parts master file 16 is scanned, and the required data including the parts supply factory code is extracted therefrom so that the order issue data is produced on the basis of the extracted data.

The production of data for the "supply-in-order" system is performed in accordance with FIG. 6(3). Car information is issued every time a car is brought onto the assembly line of the assembly factory 10. The car information includes a car specification indicating the kind of the car and the assembly series number therefor. The assembly series number is used to marry up the car to be brought onto the assembly line with the parts to be mounted in the car. Since it is necessary to change the car specification into the corresponding part codes, a concordance table 19 (see FIG. 3(4)) giving the corresponding part codes for operation in accordance with the "supply-in-order" system, is stored in the host computer 15.

At step 631, the car information sent from the "supply-in-order" system 13 is received by the order issue managing system 14. Then, at step 632, the car information is changed into the corresponding parts code using the table 19. Then, at step 633, the parts master file 16 is scanned and the required data including the order type "3", the parts supply factory code, and the assembly factory code corresponding to the respective post code, is extracted from the part master file 16 in order to produce the order issue data In the order issue data, the number "1" is inserted in the column of the number of the parts housed in a pallet, and number "1" is inserted in the column of the number of part to be supplied. The order issue data designated by an order issue series number, is sent to the corresponding parts supply factory 20 via the communication network 30. At step 634, the issued data is stored in the issued order file.

Figure 4:
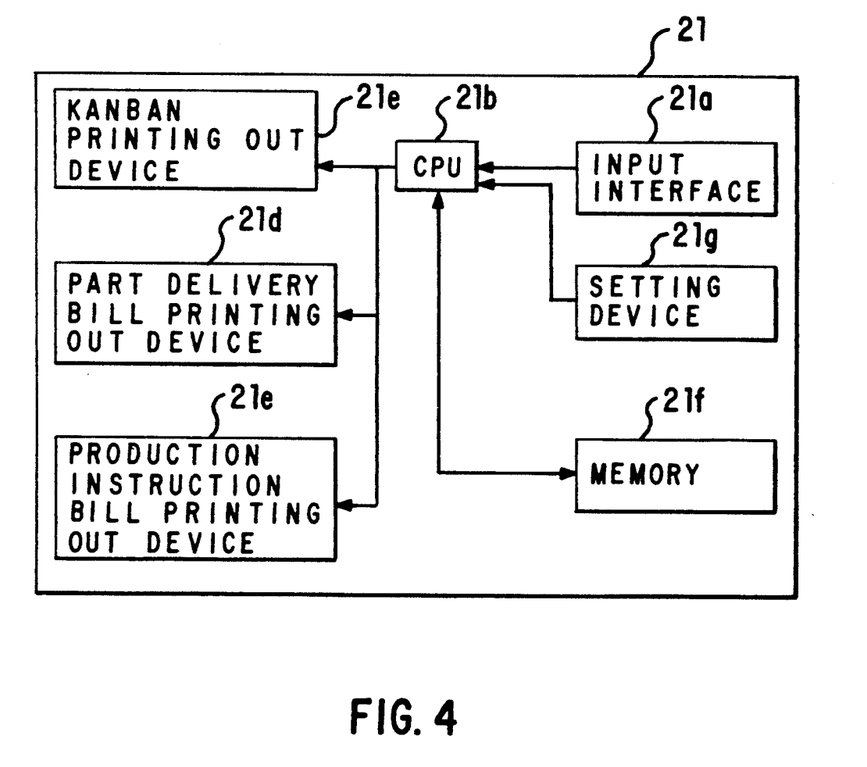
FIG. 4 is a block diagram of a received order managing system of the parts supply instruction apparatus of FIG. 1.

As described above, order issue data is produced in accordance with the type of parts supply system being operated. Each parts supply factory 20 is provided with a received order managing system 21 which receives the orders issued from the order issue managing system 14. As illustrated in FIG. 4, the received order managing system 21 includes an input interface 21a, a central processor unit 21b, a Kanban printing-out device 21c, a part delivery bill printing-out device 21d, a production instruction bill printing-out device 21e, a memory 21f, and a setting device 21g.

For example, in the case of the Kanban supply system, the received order managing system 21 receives the order issue data from the order issue managing system 14 and prints-out a Kanban for each part code.

Figure 5:
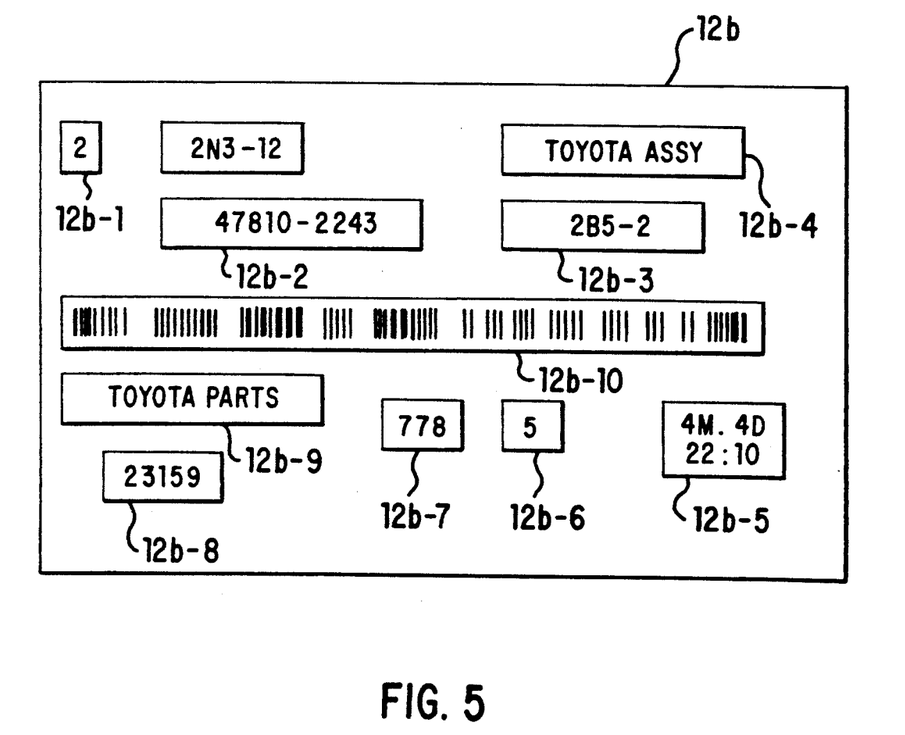
FIG. 5 is a front elevational view of a Kanban for use when the parts information system is selected for the operation of the parts supply instruction apparatus of FIG. 1.
Figure 6:
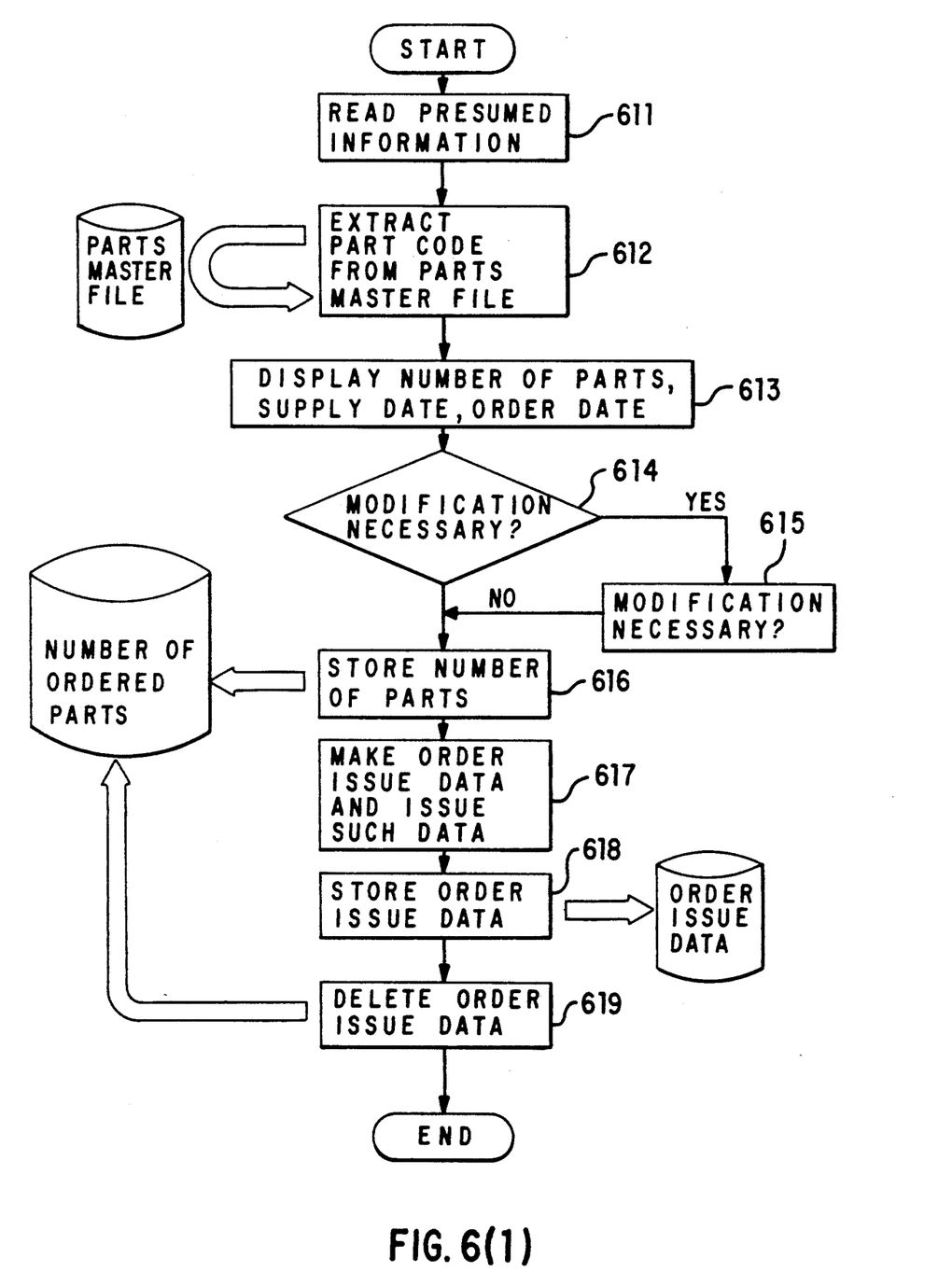

FIG. 5 illustrates one example of the contents of a Kanban 12b. The Kanban 12b includes an order type column 12b-1, a part code column 12b-2, an assembly factory code column 12b-3, an assembly factory name column 12b-4, a supply date/time column 12b-5, a column 12b-6 for indicating the number of parts housed in one pallet, a simplified part number column 12b-7, a parts supply factory code column 12b-8, and a parts supply factory name column 12b-9. For example, the parameter "2" inserted in the order type column 12b-1 indicates that the current parts supply system is a "parts information" system. The part code "47810-2243" inserted in the part code column 12b-2 indicates that the object part to be handled is the part with a part code number "47810-2243". The assembly factory code "2B5-2" inserted in the assembly factory code column 12b-3 indicates that the assembly factory where the object part should be supplied has a code number "2B5-2". The assembly factory name "TOYOTA FACTORY" is a name of the assembly factory corresponding to the code "2B5-2". The information inserted in the supply date/time column 12b-5 indicates that the object part is conveyed to the assembly factory at 22.10 on April 4. Number "5" inserted in the column 12b-6 indicates that five parts are housed in one pallet. The parts supply factory code "23159" inserted in the parts supply factory code column 12b-8 indicates that the parts supply factory which supplies the object part has a factory code "23159". The factory name "TOYOTA PARTS" in the parts supply factory name column 12b-9 is the name of the parts supply factory. This data is also printed in the form of a bar code 12b-10 on the Kanban.

The operation of the production instruction apparatus will now be explained.

In each assembly factory 10, production schedule information, or parts supply information, or car information is selectively sent to the order issue managing system 14 of the assembly factory 10. The order issue managing system 14 produces order issue data on the basis of such information. The order issue managing system 14 scans the parts master file 16 stored in the host computer 15 and extracts the required data from it.

In accordance with the present invention, the master file 16 and the computer of the order issue managing system 14 are used in common for operation of all of the three part supply systems. The master file 16 has a standardized form which can be used for any one of the three parts supply systems. In contrast, in the prior art, each one of the three systems has its own computer and part master file which can not be used to operate either one of the other systems.

The order issue data is sent to the corresponding parts supply factory 20 via the communication network 30. In contrast, in the part information system of the prior art, the Kanban is conveyed together with a corresponding pallet between the parts supply factory and the assembly factory by a part conveying truck.

In the forgoing description, the apparatus includes three part supply systems, namely, a production schedule system 11, a parts information system 12 and a car information system. However, an apparatus according to the invention may include only two of such systems. More particularly, the parts supply instruction apparatus may employ only a production schedule system and a part information system, or only a production schedule system and a car information system, or only a parts information system and a car information system. Such embodiments should also be understood to be included within the scope of the present invention.

According to the present invention, the following advantages are obtained:

Firstly, since the parts supply instruction apparatus includes a parts master file standardized for a plurality of parts supply systems, and an order issue managing system capable of selecting any one of a plurality of parts supply systems, the single parts supply instruction apparatus can be used in common for operating a plurality of different parts supply systems.

Secondly, since the selection of one of the plurality of parts supply systems can be performed merely by changing a parameter inserted in the order type column of the parts master file, such selection is very simple and is unlikely to cause any errors to occur.

Thirdly, each parts supply system does not require a large computer and since the computer of the order issue managing system is used in common for the operating the plurality of parts supply systems, the cost of the apparatus is minimized.

Although some embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A parts supply instruction apparatus for giving instructions for the supply of parts from at least one parts supply factory to at least one assembly factory, the apparatus comprising:
    a production schedule system for providing a parts supply schedule for an object assembly factor on the basis of a presumed car production schedule;
    a parts information system, provided at the assembly factory, for providing information about the consumption of parts at the assembly factory, the parts information system including a first sensor for detecting the consumption of parts at the assembly factory;
    a car information system, provided at the assembly factory, for providing information about each car brought onto an assembly line of the assembly factory, the car information system including a second sensor for detecting the type of car passing the second sensor;
    an order issue managing system for scanning a parts master file to extract required data therefrom relating to parts to be ordered on the basis of information fed to the order issue managing system from the production schedule system, the parts information system and the car information system, said order issue management system including:
        a common computer for controlling the production schedule system, the parts information system and the car information system,
        a common parts master file standardized for the production schedule system, the parts information system and the car information system, the common parts master file having a column in which an order type designation parameter corresponding to the production schedule system, the parts information system or the car information system is stored for each entry, and
        a setting device for changing a present order type designation parameter to a different order type designation parameter, thereby changing a present parts supply system to another parts supply system corresponding to said different order type designation parameter; and
    a received order managing system, provided at an object parts supply factory, for receiving orders for parts issued by the order issue managing system and transmitted via a communication network and for printing out the required data relating to the ordered parts.

2. A parts supply instruction apparatus, comprising:
    a production schedule system for providing a parts supply schedule for an object assembly factory on the basis of a presumed car production schedule;
    a parts information system, provided at the assembly factory, for providing information about the consumption of parts at the assembly factory, the parts information system including a first sensor for detecting the consumption of parts at the assembly factory;
    an order issue managing system for scanning a parts master file to extract required data therefrom relating to parts to be ordered on the basis of information fed to the order issue managing system from the production schedule system and the parts information system, said order issue management system including:
        a common computer for controlling the production schedule system and the parts information system,
        a common parts master file standardized for the production schedule system and the parts information system, the common parts master file having a column in which an order type designation parameter corresponding to the production schedule system or the parts information system is stored for each entry, and
        a setting device for changing a present order type designation parameter to a different order type designation parameter, thereby changing a present parts supply system to another parts supply system corresponding to said different order type designation parameter; and
    a received order managing system, provided at an object parts supply factory, for receiving orders for parts issued by the order issue managing system and transmitted via a communication network and for printing out the required data relating to the ordered parts.

3. A parts supply instruction apparatus, comprising:

a production schedule system for providing a parts supply schedule for an object assembly factory on the basis of a presumed car production schedule;

a car information system, provided at the assembly factory, for providing information about each car brought onto an assembly line of the assembly factory, the car information system including a second sensor for detecting the type of car passing the second sensor;

an order issue managing system for scanning a parts master file to extract required data therefrom relating to parts to be ordered on the basis of information fed to the order issue managing system from the production schedule system and the car information system, said order issue management system including:

a common computer for controlling the production schedule system and the car information system, a common parts master file standardized for the production schedule system and the car information system, the common parts master file having a column in which an order type designation parameter corresponding to the production schedule system or the car information system is stored for each entry, and a setting device for changing a present order type designation parameter to a different order type designation parameter, thereby changing a present parts supply system to another parts supply system corresponding to said different order type designation parameter; and a received order managing system, provided at an object parts supply factory, for receiving orders for parts issued by the order issue managing system and transmitted via a communication network and for printing out the required data relating to the ordered parts.

4. A parts supply instruction apparatus, comprising:

a parts information system, provided at the assembly factory, for providing information about the consumption of parts at the assembly factory, the parts information system including a first sensor for detecting the consumption of parts at the assembly factory;

a car information system, provided at the assembly factory, for providing information about each car brought onto an assembly line of the assembly factory, the car information system including a second sensor for detecting the type of car passing the second sensor;

an order issue managing system for scanning a parts master file to extract required data therefrom relating to parts to be ordered on the basis of information fed to the order issue managing system from the parts information system and the car information system, said order issue management system including:

a common computer for controlling the parts information system and the car information system, a common parts master file standardized for the parts information system and the car information system, the common parts master file having a column in which an order type designation parameter corresponding to the parts information system or the car information system is stored for each entry, and a setting device for changing a present order type designation parameter to a different order type designation parameter, thereby changing a present parts supply system to another parts supply system corresponding to said different order type designation parameter; and a received order managing system, provided at an object parts supply factory, for receiving orders for parts issued by the order issue managing system and transmitted via a communication network and for printing out the required data relating to the ordered parts.

5. A parts supply instruction apparatus according to any one of claims 1, 2, 3 or 4, wherein the order issue managing system includes means for selectively changing a parts supply system between at least two such systems by changing a designation parameter inserted in an order type column of the parts master file between at least two designation parameters which correspond to said at least two systems, respectively.

6. A parts supply instruction apparatus according to any one of claims 1, 2, 4, wherein information about parts to be supplied is transmitted electrically via the communication network from the order issue managing system to the received order managing system and a Kanban is printed-out by the received order managing system.

7. A parts supply instruction apparatus according to any one of claims 1, 2 or 4, wherein the first sensor comprises a bar code sensor capable of reading a bar code printed on a Kanban.

8. A parts supply instruction apparatus according to any one of claims 1, 2 or 4, wherein the parts master file includes columns including a part code, a parts supply factory code and an assembly factory code.

9. A parts supply instruction apparatus according to any one of claims 1, 2, 3 or 4, wherein the order issue managing system is electrically connected to a host computer in which the parts master file is stored.

* * * * *